United States Patent
Sugiyama

(10) Patent No.: US 7,218,833 B2
(45) Date of Patent: May 15, 2007

(54) WIRELESS COMMUNICATION SYSTEM AND APPARATUS

(75) Inventor: Yuichi Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/067,832

(22) Filed: Feb. 28, 2005

(65) Prior Publication Data

US 2005/0196126 A1    Sep. 8, 2005

(30) Foreign Application Priority Data

Mar. 8, 2004    (JP) .............................. 2004-064586

(51) Int. Cl.
*G02B 6/00* (2006.01)
*H01P 5/12* (2006.01)
*H01P 1/00* (2006.01)

(52) U.S. Cl. .................. 385/147; 385/135; 333/135; 333/137; 333/248

(58) Field of Classification Search .............. 385/24, 385/88–90, 147
See application file for complete search history.

(56) References Cited

U.S. PATENT DOCUMENTS 6,671,436 B2  12/2003  Medved et al.

FOREIGN PATENT DOCUMENTS

| CA | 2440451 | 10/2002 |
|---|---|---|
| JP | 5-31301 | 4/1993 |
| WO | WO 02/080580 A1 | 10/2002 |

*Primary Examiner*—Sung Pak
*Assistant Examiner*—Omar Rojas
(74) *Attorney, Agent, or Firm*—Scully, Scott, Murphy & Presser, P.C.

(57) ABSTRACT

A wireless communication system comprises a plurality of wireless communication apparatus, a plurality of sub-racks, and a rack. The wireless communication apparatus comprises a demultiplexing circuit, a cable to be connected to the demultiplexing circuit, a waveguide interface to be connected to the cable, and a waveguide to connect the waveguide interface and the antenna. A plurality of sub-racks for each housing the wireless communication apparatus to be connected to an antenna are installed in the rack. Among a plurality of the wireless communication apparatus which are different from one another, a pair of the waveguide interface and waveguide is disposed at a different position from other pair/pairs of waveguide interface and waveguide on a predetermined projectional plane. The waveguide assigned to each of the wireless communication apparatus extends along an outside of the sub-rack.

9 Claims, 4 Drawing Sheets

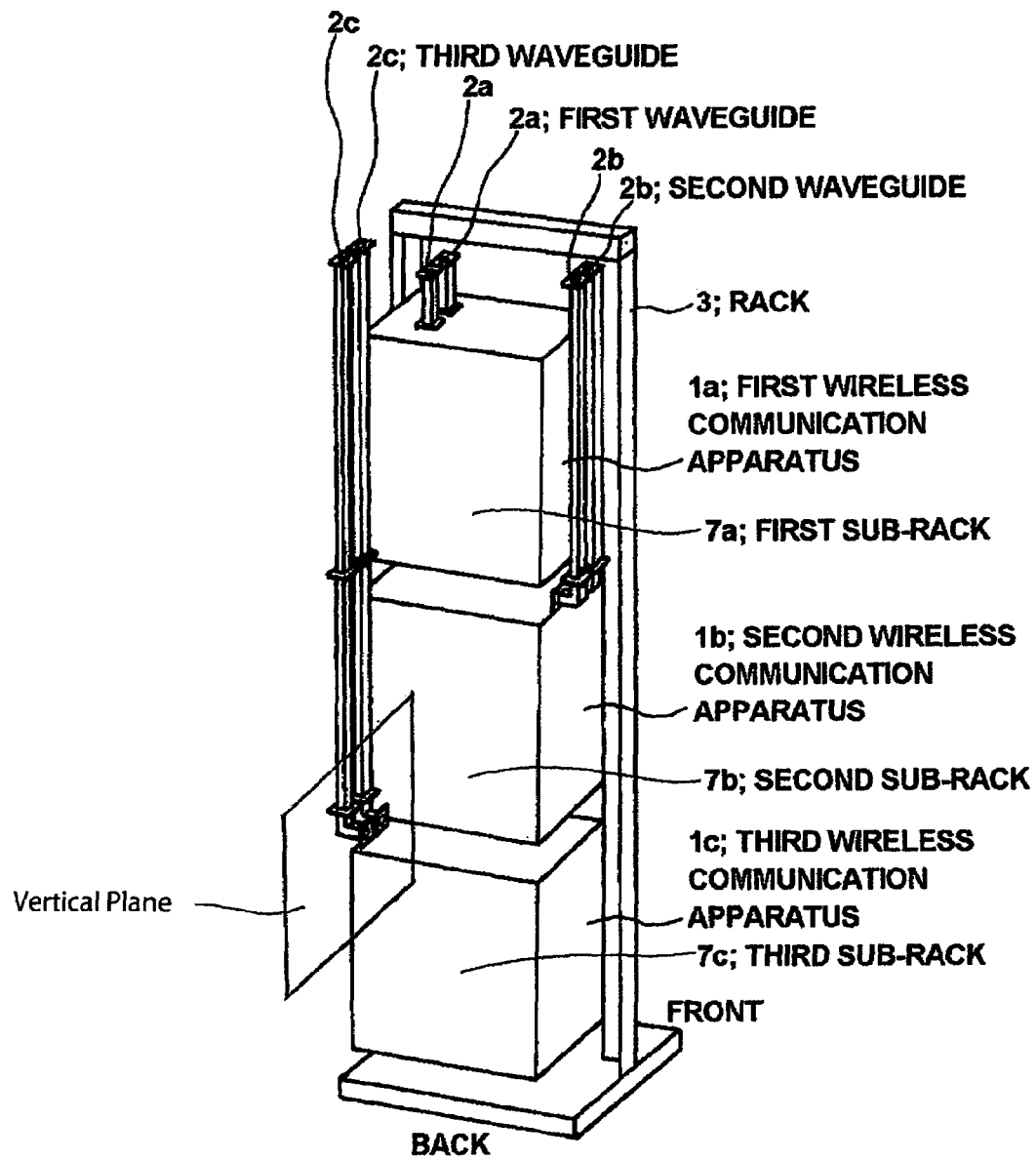

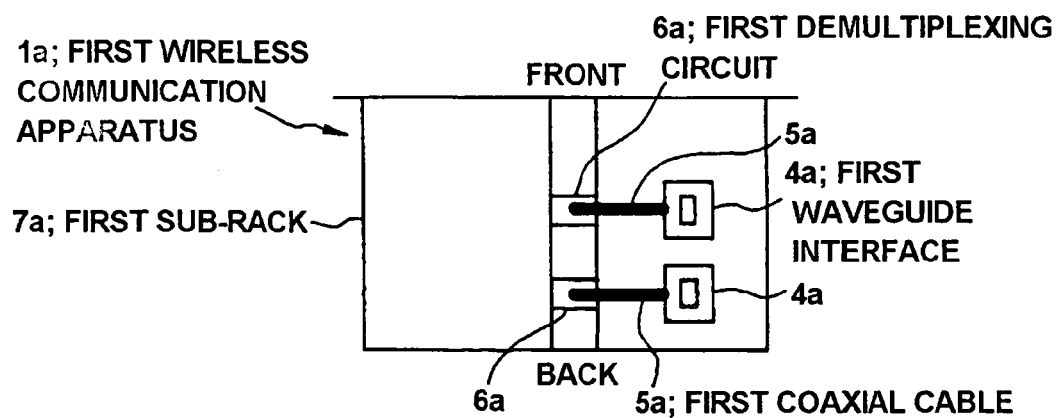
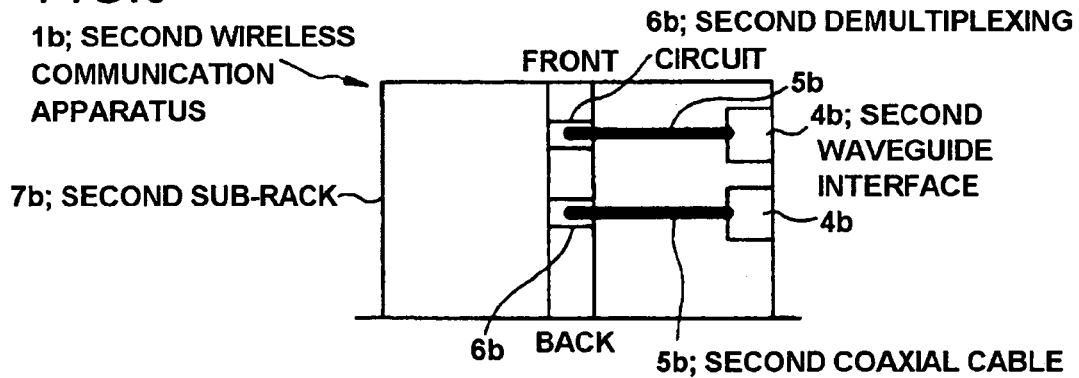

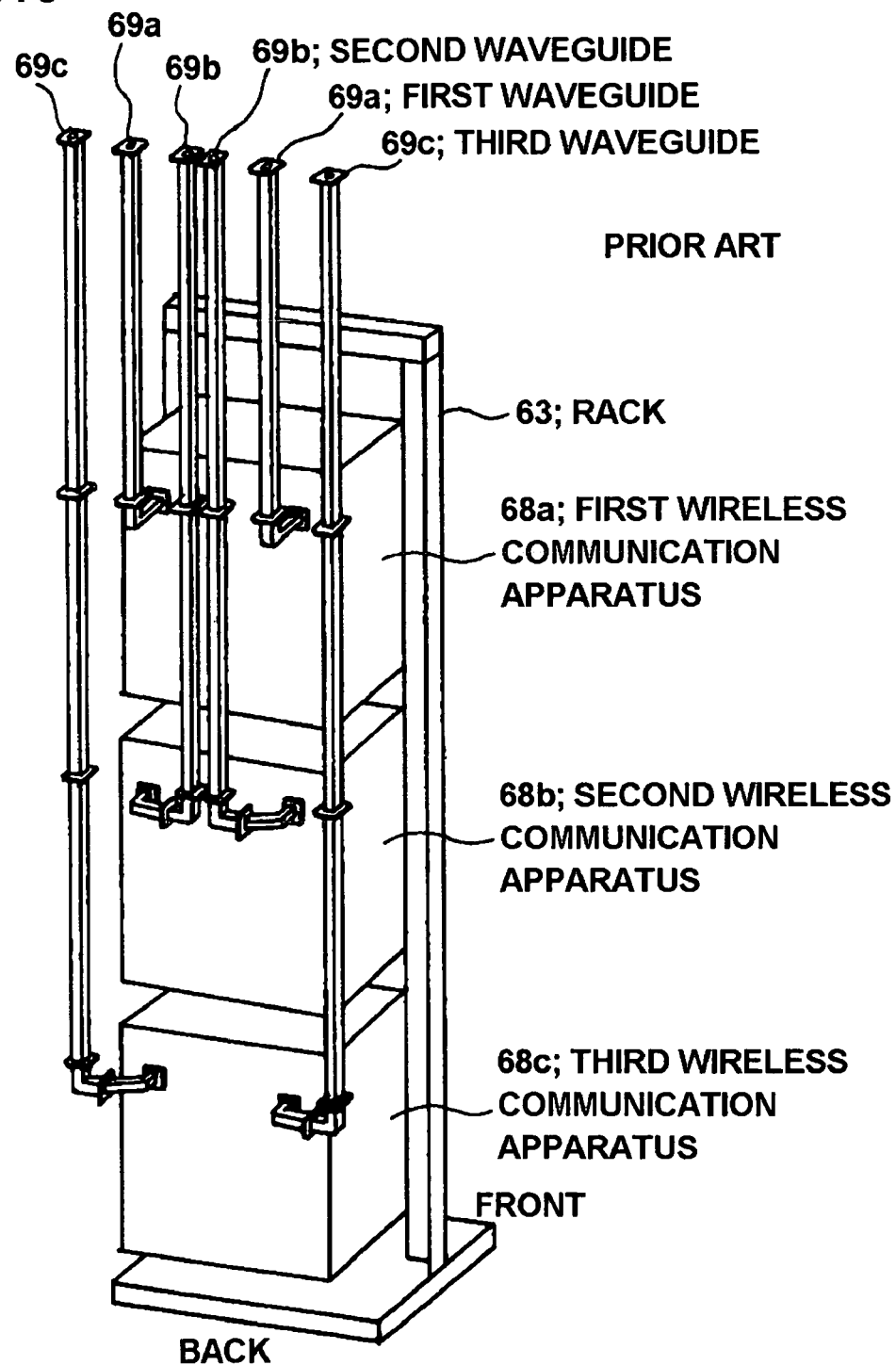

WIRELESS COMMUNICATION SYSTEM AND APPARATUS

FIELD OF THE INVENTION

The present invention relates to a wireless communication system and wireless communication apparatus, and particularly, a wireless communication system and wireless communication apparatus of an intra-office placement type which are connected with an antenna via a waveguide.

BACKGROUND OF THE INVENTION

As an antenna side interface of a microwave band wireless communication apparatus, a waveguide is generally used. When the wireless communication apparatus is placed in an office or shelter, the antenna and the wireless communication apparatus are connected through the waveguide.

In the wireless communication system architecture, it is required to reduce its costs. For achieving this goal, it is necessary to reduce the total costs, for example, the wireless communication apparatus itself, as well as the system design, the placement of the apparatus, the maintenance and the operation.

FIG. 6 is a figure to explain constitution of a wireless communication system according to a first conventional example. Referring to FIG. 6, first to third wireless communication apparatus (sub-racks) 68a, 68b, 68c are installed in a rack 63. On each back surface of the first to third wireless communication apparatus 68a, 68b, 68c, there are provided with waveguide interfaces. The waveguide interfaces disposed at the back sides and antenna side interfaces (not shown) disposed above the rack 63 are connected through waveguides 69a, 69b, 69c, respectively.

In detail, in the first wireless communication apparatus 68a installed at an upper tier of the rack 63, the first waveguides 69a extend from the back surface just upward. In the second wireless communication apparatus 68b installed at a middle tier of the rack 63, the second waveguides 69b extend so as to come near each other toward the center of the back surface and then turn to extend upward. In the third wireless communication apparatus 68c installed at a lower tier, the third waveguides 69c go out the outside and then turn to extend upward. In the first to third wireless communication apparatus (sub-racks) 68a, 68b, 68c, each waveguide interface is disposed at the same position of the sub-rack. When the first to third waveguides 69a, 69b, 69c are connected to upper antennas, in order to prevent each waveguide from interfering with one another, each waveguide is bent, and each shape of the first to third waveguides 69a, 69b, 69c is made different from one another.

JP-H05-31301-U discloses a housing structure of a communication apparatus, having a housing in the shape of a rectangular parallelepiped, which is formed by providing facing panels between four cylindrical strengthening members, the housing having a demultiplexer, first coaxial cables and first conversion sections in the middle part, and second conversion sections, second coaxial cables, third conversion sections and waveguides in the upper part, the demultiplexer and the middle parts of the strengthening members connecting via the first coaxial cables and the first conversion sections in turn, the upper ends of the strengthening members connected to the demultiplexer and the waveguides connecting via the second conversion sections, the second coaxial cables and the third conversion sections in turn. The strengthening members compose a frame of the housing and are also used as microwave propagating circuits.

DISCLOSURE OF THE INVENTION

In the first conventional example, the waveguides extend so as to come near toward the center of the apparatus or go out into the outside of the apparatus in order to upwardly extend the waveguides from the rack, so various waveguides, fixing brackets and others are necessary.

In the first conventional example, each position of the waveguide interfaces in the wireless communication apparatus is fixed at the same position of the back side of the apparatus (sub-rack). Accordingly, in order to extend the waveguides upwardly, it is necessary to determine a design and shape of each waveguide so as to prevent each waveguide from interfering with one another, considering a position of the apparatus in the rack and a space around the apparatus. As a result, the number of design steps increases.

In the first conventional example, since any waveguide extends along the back side of the apparatus, working at the back side of the apparatus is indispensable when the apparatus is installed in the office or maintained and inspected. Accordingly, in the office, it is necessary to keep a large space at the back side of the apparatus to be installed. As a result, the installation efficiency in the office decreases.

In the housing structure of the communication apparatus disclosed in JP-H05-31301-U, a problem is that it is difficult to modify the position of the waveguide according to the environment to place the communication apparatus, because the waveguides compose the frame of the housing. Another problem is that the kinds and number of the parts, such as the waveguide including the strengthening member, the coaxial cable, the conversion section and others, are increased. Therefore, there is much to be desired in the art.

An object of the present invention is to provide a wireless communication system, wherein the position of a waveguide can be easily modified according to the environment in which the wireless communication apparatus is employed, wherein installation and maintenance can be carried out as efficiently as possible, and wherein the kinds and number of the parts of a wireless communication apparatus installed in the system can be decreased.

According to a first aspect, the present invention provides a wireless communication system comprising a plurality of wireless communication apparatus, a plurality of sub-racks, and a rack. A plurality of the sub-racks each housing the wireless communication apparatus to be connected to an antenna are installed in the rack. The wireless communication apparatus comprises a demultiplexing circuit, a cable to be connected to the demultiplexing circuit, a waveguide interface to be connected to the cable, and a waveguide to connect the waveguide interface and the antenna. Among a plurality of the wireless communication apparatus which are different from one another, a pair of the waveguide interface and waveguide is disposed at a different position from other pair/pairs of waveguide interface and waveguide on a predetermined projectional plane. The waveguide or waveguides assigned to each of the wireless communication apparatus extends along an outside of the sub-rack.

According to a second aspect, the present invention provides a wireless communication apparatus, which is adapted for connection to an antenna and installment in a sub-rack to be housed in a rack. The wireless communication apparatus comprises a demultiplexing circuit, a cable to be connected to the demultiplexing circuit, a waveguide interface to be connected to the cable, and a waveguide to connect the waveguide interface and an antenna. The waveguide extends along a vertical plane including the waveguide interface, which connects with the waveguide, within at least an extent of the rack.

The present invention has a first effect that it is possible to reduce and standardize the kinds of a waveguide for antenna connection. The reason is that the present invention makes it possible to modify a position at which a waveguide interface is disposed.

The present invention has a second effect that based on the first effect design, placement, maintenance and operation become easy. According to the present invention, for example, the position of the waveguide interface can be modified in consideration of an embodiment of an installation of the wireless communication apparatus or securement of working space around the apparatus, so individual design of each waveguide becomes unnecessary. According to the wireless communication system of the present invention, it also becomes possible to economically and flexibly modify a position for disposition of a waveguide, which is an antenna side interface of the wireless communication apparatus, according to environment for installation of the wireless communication apparatus, so the working space for the installation or the maintenance and inspection can be secured sufficiently.

The present invention has a third effect that based on the first effect the costs of system architecture is reduced. It is possible, for example, to standardize each waveguide or to reduce the number of kinds of the waveguides, so reduction of the costs and shortening of preparation time owing to an effect of mass production can be expected.

BRIEF DESCRIPTION OF THE DRAWINGS

FIG. 1 is a figure showing constitution of a wireless communication system according to one example of the present invention.

FIG. 2 is a figure showing constitution of a wireless communication apparatus installed at an upper tier of the rack shown in FIG. 1.

FIG. 3 is a figure showing constitution of a wireless communication apparatus installed at a middle tier of the rack shown in FIG. 1.

FIG. 6 is a figure showing a housing structure of a wireless communication system according to a first conventional example.

DETAILED DESCRIPTION OF THE PREFERRED EMBODIMENT

Figure 4:
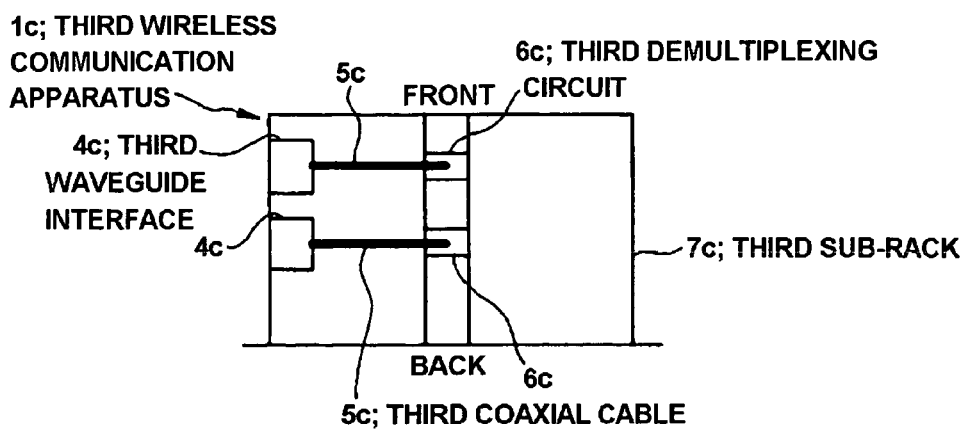
FIG. 4 is a figure showing constitution of a wireless communication apparatus installed at a lower tier of the rack shown in FIG. 1.

A preferred embodiment for carrying out the present invention is explained below.

In an embodiment of a wireless communication system according to the present invention, a sub-rack which houses a wireless communication apparatus is a polyhedron, for example, a hexahedron or a polyhedron which has faces of more than six, and, among a plurality of the wireless communication apparatus which are different from one another, each waveguide interface is disposed at a different face of the polyhedron from the waveguide interface(s) of other wireless communication apparatus.

In the embodiment of the wireless communication system according to the present invention, each waveguide extends along one direction.

In the embodiment of the wireless communication system according to the present invention, at least two, preferably three or more, sub-racks are installed in a rack. The wireless communication system of the present invention is also preferably adapted for three systems of the wireless communication apparatus which are installed in one rack, thereby giving the effects of the present invention.

In the embodiment of the wireless communication system according to the present invention, a plurality of sub-racks are stacked in the rack along the direction along which the waveguides extend.

EXAMPLES

In order to describe the present invention in more detail, one example of the present invention is explained below, referring to the annexed drawings.

FIG. 1 is a figure showing constitution of a wireless communication system according to one example of the present invention.

Referring to FIG. 1, a wireless communication system according to one example of the present invention has first to third wireless communication apparatus 1a, 1b, 1c, namely, first to third hexahedral sub-racks 7a, 7b, 7c, installed in one rack 3. The first to third sub-racks 7a, 7b, 7c are stacked in turn from the top in the rack.

The first wireless communication apparatus 1a comprises a transmitting unit and receiving unit which are not shown, and first demultiplexing circuits (branches) 6a (referring to FIG. 2) which divide waves according to a frequency for transmission and reception, and these are installed in the sub-rack 7a together.

With regard to the constitution explained above, the second and third wireless communication apparatus 1b, 1c also have the constitution similar to the first wireless communication apparatus. First to third waveguides 2a, 2b, 2c connected to the first to third wireless communication apparatus 1a, 1b, 1c, respectively, upwardly extend in parallel along outsides of the first to third sub-racks 7a, 7b, 7c. A direction along which the first to third sub-racks are stacked in the rack and the direction along which the first to third waveguides 2a, 2b, 2c extend are the same.

Next, each disposition of the waveguide interfaces in the wireless communication apparatus 1a, 1b, 1c installed at the upper, middle and lower tiers of the rack 3, respectively, and each disposition of the waveguides connected to the wireless communication apparatus is explained.

FIG. 2 is a figure showing constitution of the wireless communication apparatus installed at the upper tier of the rack shown in FIG. 1.

Referring to FIGS. 1 and 2, the first wireless communication apparatus 1a comprises the first demultiplexing circuits 6a, first coaxial cables 5a to be connected to the first demultiplexing circuits 6a, first waveguide interfaces 4a to be connected to the first coaxial cables 5a, and first waveguides 2a to connect the first waveguide interfaces 4a and antennas which are not shown, the first waveguides 2a extending along the outside of the first sub-rack 1a.

In the first wireless communication apparatus 1a installed at the most upper tier of the rack 3, the first waveguides 2a can be easily disposed on and above the first sub-rack 7a, and the first waveguide interfaces 4a are therefore disposed upward on a top face of the first sub-rack 7a.

FIG. 3 is a figure showing constitution of the wireless communication apparatus installed at the middle tier of the rack shown in FIG. 1.

Referring to FIGS. 1 and 3, the second wireless communication apparatus 1b comprises second demultiplexing circuits 6b, second coaxial cables 5b to be connected to the second demultiplexing circuits 6b, second waveguide interfaces 4b to be connected to the second coaxial cables 5b, and second waveguides 2b to connect the second waveguide interfaces 4b and antennas which are not shown, the second waveguides 2b extending along the outside of the second sub-rack 7b.

In the second wireless communication apparatus 1b installed at the middle tier of the rack 3, the second coaxial cables 5b are pulled out to a right side of the second sub-rack 7b, the second waveguide interfaces 4b are disposed on the right side face, and the second waveguides extend upward and along the right side face of the second sub-rack 7b. Thus, a space is secured at a back of the rack 3 sufficiently.

FIG. 4 is a figure showing constitution of the wireless communication apparatus installed at the lower tier of the rack shown in FIG. 1.

Referring to FIGS. 1 and 4, the third wireless communication apparatus 1c comprises third demultiplexing circuits 6c, third coaxial cables 5c to be connected to the third demultiplexing circuits 6c, third waveguide interfaces 4c to be connected to the third coaxial cables 5c, and third waveguides 2c to connect the third waveguide interfaces 4c and antennas which are not shown, the third waveguides 2c extending along the outside of the third sub-rack 7c.

In the third wireless communication apparatus 1c installed at the most lower tier of the rack 3, the third coaxial cables 5c are pulled out to a left side of the third sub-rack 7c, the third waveguide interfaces 4c are disposed on the left side face, and the third waveguides extend upward and along the left side face of the third sub-rack 7c. Thus, a space is secured at the back of the rack 3 sufficiently.

In the first to third wireless communication apparatus 1a, 1b, 1c which are different from one another, by means of each constitution of the wireless communication apparatus 1a, 1b, 1c explained above, the first to third waveguide interfaces 4a, 4b, 4c and the first to third waveguides 2a, 2b, 2c are disposed at different positions from one another on a predetermined projectional plane, or when the wireless communication system is looked down from just above of the rack 3 (see FIGS. 2–4 on top of one another). In other words, in a plurality of the wireless communication apparatus 1a, 1b, 1c which are different from one another, each of the first to third waveguide interfaces 4a, 4b, 4c is disposed on a different face of a hexahedron from other waveguide interfaces. Thus, waveguides having the same kind of shape, particularly, a shape of a substantially straight pipe, can be adopted as the first to third waveguides 2a, 2b, 2c. Reduction in the number of kinds and standardization of the kinds of the waveguides for antenna connection can be therefore achieved.

According to this example, the waveguide interface and the demultiplexing circuit are connected via the coaxial cable. Since this coaxial cable is easy to bend, the position of the waveguide interface is determined according to an optimum disposition of the waveguide, and the connection of the waveguide interface and the demultiplexing circuit can be easily obtained by bending the coaxial cable suitably.

According to this example, in the wireless communication apparatus installed at and below the middle tier of the rack, each waveguide is disposed at the different side from the waveguides of other wireless communication apparatus. Thus, interference between the waveguides of the upper most wireless communication apparatus and the waveguides of the middle and lower wireless communication apparatus can be avoided, and the working space can be also secured at the front and back side of the rack sufficiently.

Figure 5:
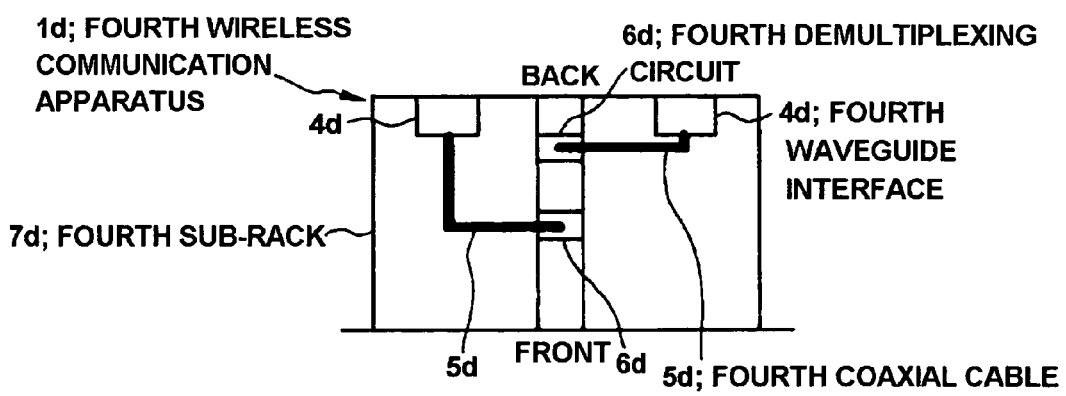
FIG. 5 is a figure showing an example of another constitution of a wireless communication apparatus to be applied to a wireless communication system according to one example of the present invention.

FIG. 5 is a figure showing an example of another constitution of the wireless communication apparatus which is applied to the wireless communication system according to one example of the present invention. The constitution shown in FIG. 5 is adopted if it is preferred that the waveguides are disposed at the back side of the rack 3.

Referring to FIGS. 1 and 5, a fourth wireless communication apparatus 1d comprises fourth demultiplexing circuits 6d, fourth coaxial cables 5d to be connected to the fourth demultiplexing circuits 6d, fourth waveguide interfaces 4d to be connected the fourth coaxial cables 5d, and fourth waveguides, which are not shown, to connect the fourth waveguide interfaces 4d and antennas which are not shown, the fourth waveguides extending along an outside of a fourth sub-rack 7d.

In the fourth wireless communication apparatus 1d disposed in the rack 3, the fourth coaxial cables 5d are pulled out to a back side of the fourth sub-rack 7d, the fourth waveguide interfaces 4d are disposed on the back face, and the fourth waveguides extend upward and along the back face of the fourth sub-rack 7d. Thus, a space can be secured at a front side of the rack 3 sufficiently.

Throughout the embodiments shown in FIGS. 1 to 5, each pair of the demultiplexing circuits is disposed at the same position of the sub-rack, which simplifies the manufacturing of the wireless communication apparatus to be installed in each of sub-racks. Also the number of bents of the waveguide is reduced due to the specific arrangement of the interfaces on the sub-racks.

The present invention is explained above based on the example, but it is understood that the present invention is not limited to the constitution of the example and includes various modifications which a person skilled in the art could make within a scope of the present invention.

What is claimed is:

1. A wireless communication system comprising:
   a plurality of different wireless communication apparatii, a plurality of sub-racks, and a rack;
   wherein the plurality of the sub-racks, each housing the wireless communication apparatii to be connected to an antenna, are installed in the rack;
   each of said wireless communication apparatii comprising a demultiplexing circuit, a cable connected to the demultiplexing circuit, a waveguide interface connected to the cable, and a waveguide connecting a respective waveguide interface and the antenna;
   each respective waveguide interface and waveguide connected thereto being disposed at a different position and face of the respective sub-rack associated therewith relative to the other respective connected waveguide interface and waveguide on a predetermined projectional plane;
   each waveguide assigned to a respective one of said wireless communication apparatii and extending along an outside of at least a respective one of said sub-racks.

2. The wireless communication system as in claim 1, wherein each sub-rack is a polyhedron;
   each respective waveguide interface being disposed on a different face of the polyhedron.

3. The wireless communication system as in claim 1, wherein the waveguides extend along one direction.

4. The wireless communication system as in claim 1, wherein at least two of said sub-racks are installed in the rack.

5. The wireless communication system as in claim 1, wherein a plurality of the sub-racks are stacked in a direction, along which said waveguides extend, in the rack.

6. The wireless communication system as in claim 1, wherein each waveguide extends along a vertical plane including a respective waveguide interface, which connects with the waveguide, within at least an extent of said rack.

7. The wireless communication system as in claim 1, wherein each waveguide upwardly extends along a vertical plane, including a respective waveguide interface connected thereto, each waveguide extending from a respective waveguide interface to an upper-most one of the sub-racks.

8. The wireless communication system as in claim 2, wherein said sub-racks are rectangular parallelepipeds.

9. The wireless communication system as in claim 8, wherein each waveguide interface is disposed at a face other than a back side face of a respective sub-rack.

* * * * *